United States Patent [19]

Harvey

[11] Patent Number: 4,736,979
[45] Date of Patent: Apr. 12, 1988

[54] AUXILIARY SUN VISOR

[76] Inventor: Walter R. Harvey, Box 25, Hector, Minn. 55342

[21] Appl. No.: 872,136

[22] Filed: Jun. 9, 1986

[51] Int. Cl.⁴ .............................................. B60J 3/02
[52] U.S. Cl. ................................................. 296/97 G
[58] Field of Search ................. 296/97 G, 97 F, 97 R, 296/97 B; 160/DIG. 3

[56] References Cited

U.S. PATENT DOCUMENTS

| | | | |
|---|---|---|---|
| 2,422,863 | 6/1947 | Slroth | 296/97 G |
| 2,596,873 | 5/1952 | Solmes | 296/97 G |
| 3,865,428 | 2/1975 | Chester | 296/97 G |
| 4,058,340 | 11/1977 | Pinkas | 296/97 G |
| 4,264,100 | 4/1981 | Keeler | 296/97 G |
| 4,323,275 | 4/1982 | Lutz | 296/97 G |

Primary Examiner—Robert R. Song
Attorney, Agent, or Firm—Fleit, Jacobson, Cohn & Price

[57] ABSTRACT

An improvement to vehicle sunvisors which allows the user to selectively position a light shield in such a way as to cover the most objectional light source within his field of vision while maintaining unaltered vision in the areas adjacent to that light source.

8 Claims, 2 Drawing Sheets

U.S. Patent  Apr. 12, 1988  Sheet 1 of 2  4,736,979
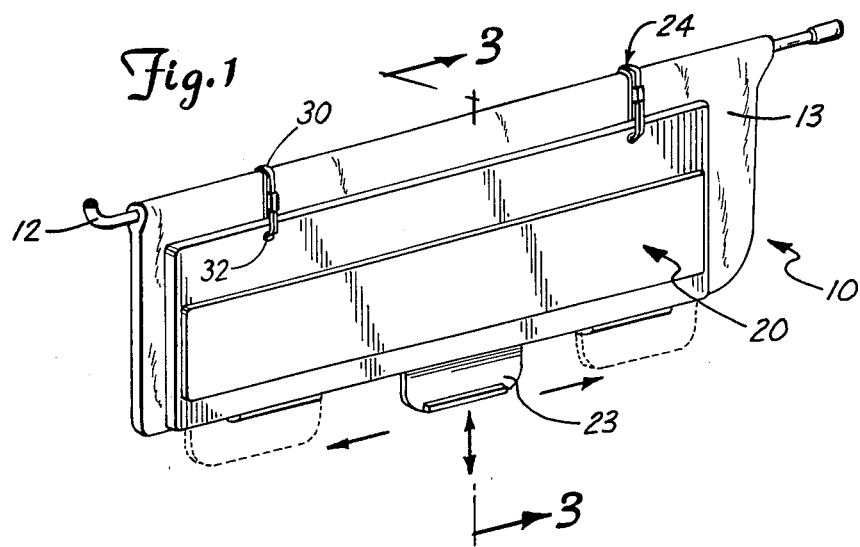
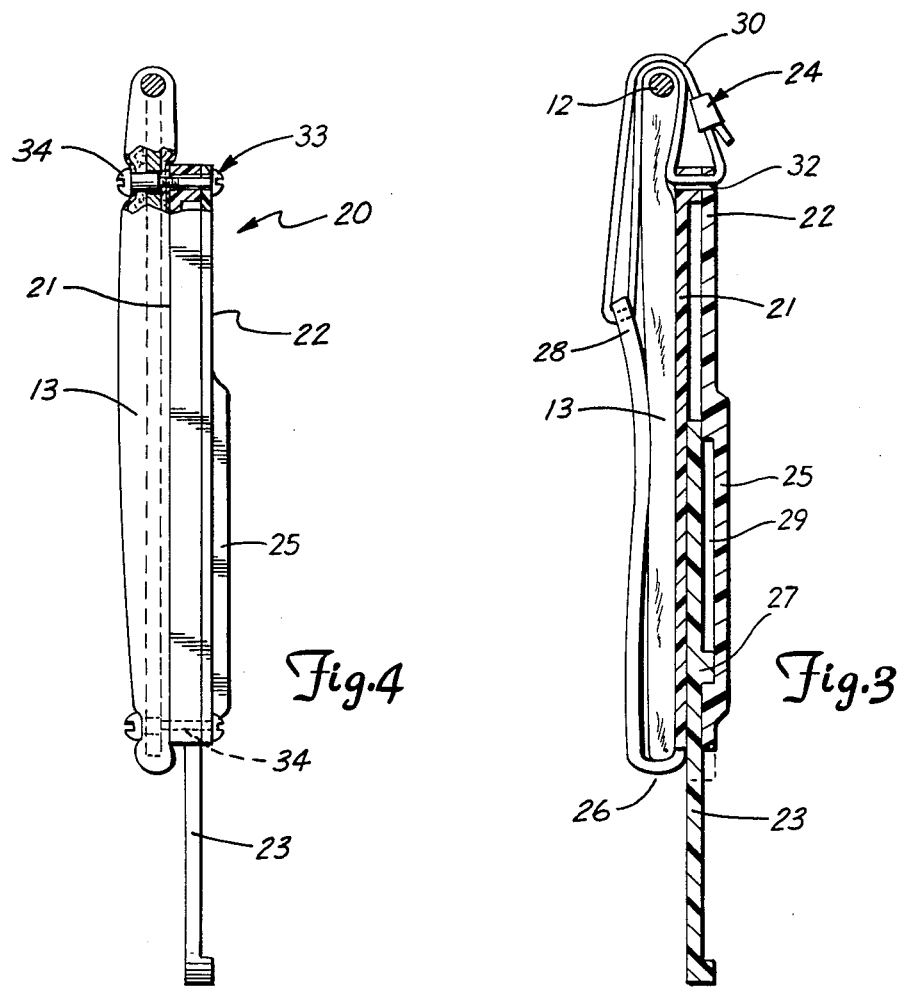

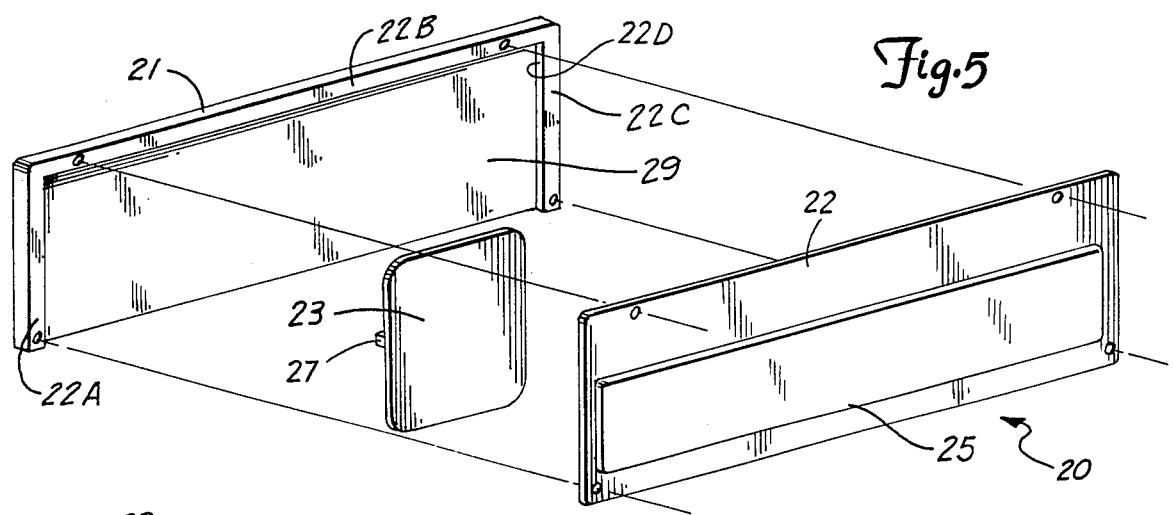
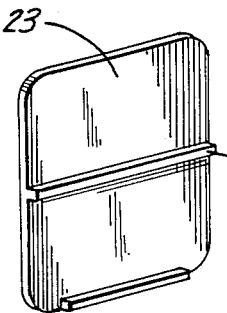
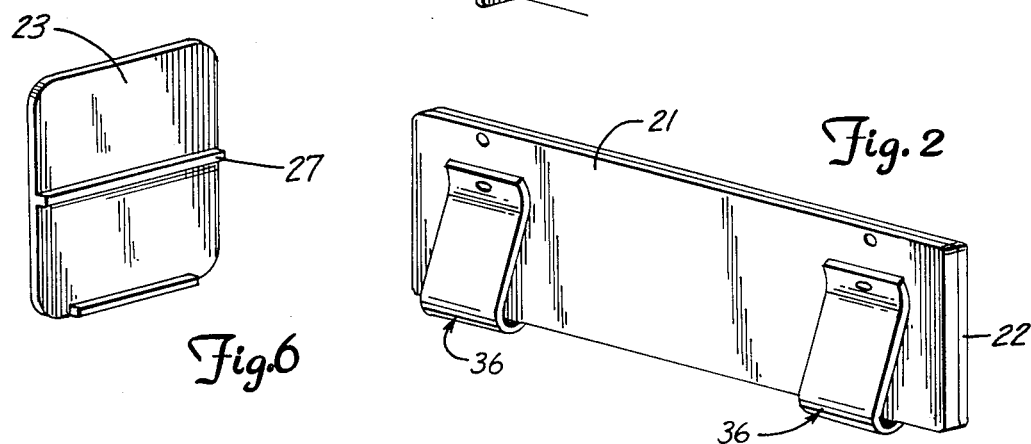
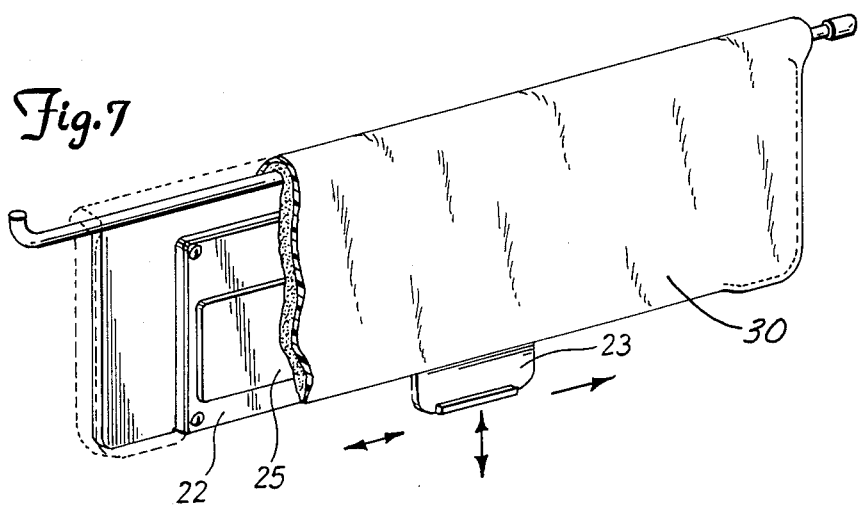

AUXILIARY SUN VISOR

SUMMARY OF THE INVENTION

A light shield held within a sun visor extension. Said extension being fabricated in such a way as to allow the light shield to be adjusted by the user to block only a point source of light such as the sun or a set of headlights on an oncoming vehicle, while allowing the user to clearly see objects on either side of and below the point source of light.

BACKGROUND OF THE INVENTION

The present invention constitutes an improvement over other inventions in the sun visor field by virtue of its greater flexibility of use. The present invention allows the user to easily position an optimally sized light shield in such a way as to block only a point source of light in his field of vision while being able to clearly see other objects below and to both sides of the shielded area. This arrangement being superior to earlier methods because it permits a larger field of unobstructed vision, thereby increasing the factor of safety to drivers and comfort to passengers.

BRIEF DESCRIPTION OF THE DRAWINGS

FIG. 1 is a perspective view of the sun visor extension attached to a conventional vehicle sun visor.

FIG. 2 is a rear perspective view of the auxiliary sun visor.

FIG. 3 is a vertical sectional view, on an enlarged scale, taken substantially upon a plane passing along section line 3—3 on FIG. 1.

FIG. 4 is an end elevational view of the invention illustrating a modified fastening arrangement for securing the auxiliary sun visor to an existing sun visor.

FIG. 5 is an exploded group perspective view of the auxiliary sun visor.

FIG. 6 is a perspective view of the movable panel which forms one component of the auxiliary sun visor.

FIG. 7 is a perspective view, with portions broken away illustrating the auxiliary sun visor incorporated into a vehicle sun visor.

DESCRIPTION OF THE PREFERRED EMBODIMENT

A visor for vehicles illustrated generally at FIG. 1 at 10 is of a usual type. The visor includes a mounting arm 12, and a visor portion 13. Attached to the visor portion 13 is the auxiliary visor at 20. The auxiliary visor includes a rear rectangular panel 21 having raised edges at 22 A, 22 B, and 22 C, forming a first cavity, 22 D and a second panel 22 secured thereto which has a shallow offset portion 25 forming a second cavity 29, as can be best seen in FIG. 3. A third sliding rectangular panel member 23, with a raised portion 27, which serves to retain said sliding rectangular panel within said first cavity 22 D by the retention of said raised portion 27 in said second cavity 29 with the raised portion 27 frictionally engaging one wall of said second cavity 29 for exact placement of the sliding member 23 while still allowing freedom of movement within said second cavity 29. Means for attaching said auxiliary visor is shown at 24, as best seen in FIG. 3 and consists of a pair of u-shaped clip members 26, each having a hole 28, which will receive a fastening device 30, said fastening devices 30, passing through holes 32, in front and rear panel members 22 and 21, securing said auxiliary visor to said standard visor. FIG. 2 illustrates clips 36 to secure the auxiliary visor 20 to the vehicle visor 10.

An alternative fastening means 33, as best seen in FIG. 4, is to fasten the auxiliary visor 20 to said standard visor by means of machine screws and nuts 34, which would pass thorugh panels 21 and 22 and said standard visor.

A still further alternative as best seen in FIG. 7 to the fastening means 24 is to place the auxiliary visor 20 within the body of a replacement visor 35, said replacement visor 30 would have a more finished appearance than the auxiliary visor 20 and might be installed as original equipment by the vehicle manufacturer.

In operation, the user would fold the standard visor 10, down in the normal way from its stowed position in order to block the sun from view. Should the image of the sun appear below the effective range of the standard visor, as is often the case, the user of the auxiliary visor 20, would grasp the exposed portion of the sliding panel member 23, and by light pressure, move it to the desired location where it would remain until the user wished to change its position. The advantage of this method over earlier designs is that the user has an unobstructed view of the areas to the left, right and below the sliding panel member 23. while the image of the sun is completely blocked from view.

What is claimed as new is as follows:

1. An auxiliary visor comprising a pair of rectangular members attached to each other and spaced from each other at the shorter sides and one longer side to form a first cavity having an opening along the remaining edge, at least one of said rectangular members having a second cavity formed therein, said second cavity being generally the same length as the long sides of said rectangular members, and of a width of one-half or less than the short sides of said rectangular members, a third rectangular member of substantially less length than the long sides of said pair of rectangular members, said third member having means to retain itself within said second cavity and said retaining means allowing said third member to be moved the length and width of said second cavity and means for attaching said auxiliary visor to a vehicle visor.

2. The device of claim 1 wherein said auxiliary sun visor is integrated into said vehicle sun visor.

3. The device of claim 1 wherein said third rectangular member is formed from a darkly tinted transparent material.

4. The device of claim 1 wherein said rectangular members hold two said movable rectangular members.

5. In combination, a generally rectangular vehicle sun visor having a cavity extending substantially throughout the width and length thereof with one long edge of the cavity being open, and an auxiliary sun visor received in said cavity, said auxiliary sun visor including a panel having a length substantially less than the length of the cavity and having a width substantially equal to the width of the cavity with one edge of the auxiliary panel projecting through the open edge of the cavity and forming a handle enabling the auxiliary sun visor to be moved longitudinally of the vehicle sun visor and also enabling the auxiliary sun visor to be moved laterally inwardly and outwardly of the cavity through the open edge and means frictionally retaining the auxiliary sun visor in longitudinal and lateral adjusted position thereby enabling the source of objectionable light to be blocked while enabling unobstructed vision of areas along two sides and below the source of objectionable light, said means retaining the auxiliary sun visor in adjusted position including a projection on said auxiliary panel, said cavity including a recess in communication therewith and receiving the projection with the projecting limiting movement of the auxiliary panel and frictionally engaging at least one of the surfaces defining the recess for frictionally retaining the auxiliary panel in adjusted position.

6. The combination as defined in claim 5 wherein said auxiliary sun visor includes first and second panels secured together in spaced relation to form said cavity with the open edge along one long side of the auxiliary visor communicating with the cavity, said recess being formed in the inner surface of one of said spaced first and second panels with the recess extending substantially throughout the length of the auxiliary sun visor and the vehicle sun visor and having a width generally ½ the width of the auxiliary sun visor with the projection on the auxiliary panel being in the form of a longitudinal rib located centrally thereof and received in said recess, the edge of the auxiliary panel projecting from the open edge of the auxiliary sun visor including a lateral rib forming a handle to adjustably manipulate the auxiliary panel.

7. The combination as defined in claim 6 wherein said vehicle sun visor includes an interior cavity receiving the auxiliary sun visor with the vehicle sun visor including an open edge aligned with and adjacent the open edge of the auxiliary sun visor for receiving the projecting edge of the auxiliary panel.

8. The combination as defined in claim 6 together with means detachably securing the auxiliary sun visor to the vehicle sun visor, said means attaching the spaced panels along an external surface of the vehicle sun visor.

* * * * *